(12) United States Patent  
Gupta et al.

(10) Patent No.: US 9,977,581 B2
(45) Date of Patent: May 22, 2018

(54) SELECTION REFINEMENT TOOL

(71) Applicant: Adobe Systems Incorporated, San Jose, CA (US)

(72) Inventors: Aman Gupta, Saharanpur (IN); Gagan Singhal, Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 514 days.

(21) Appl. No.: 14/644,974

(22) Filed: Mar. 11, 2015

(65) Prior Publication Data

US 2016/0266763 A1 Sep. 15, 2016

(51) Int. Cl.
*G06T 3/00* (2006.01)
*G06T 11/00* (2006.01)
*G06F 3/0484* (2013.01)
*G06T 3/40* (2006.01)

(52) U.S. Cl.
CPC ...... *G06F 3/04845* (2013.01); *G06F 3/04842* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 5,880,733 A * | 3/1999 | Horvitz | | G06F 3/04815 345/427 |
| 6,100,871 A * | 8/2000 | Min | | G06F 3/04812 345/475 |
| 6,300,955 B1 * | 10/2001 | Zamir | | G06T 7/194 345/563 |
| 8,487,963 B1 * | 7/2013 | Harris | | G06T 11/00 345/619 |
| 8,526,763 B2 * | 9/2013 | Yadav | | G06T 5/008 348/263 |
| 2005/0025359 A1 * | 2/2005 | Priddy | | G06T 7/11 382/173 |
| 2005/0168488 A1 * | 8/2005 | Montague | | G06F 3/04845 345/659 |
| 2011/0102457 A1 * | 5/2011 | Bhatt | | G06F 3/0481 345/619 |
| 2012/0023456 A1 * | 1/2012 | Sun | | G06T 11/00 715/863 |

(Continued)

*Primary Examiner* — Andrew G Yang
(74) *Attorney, Agent, or Firm* — Wolfe-SBMC

(57) ABSTRACT

Selection refinement tool techniques are described in which a selection within an image is modified using a tool that automatically resizes according to the shape of selection boundaries. In one or more implementations, selection boundaries are displayed in an image that is exposed in a user interface. The selection boundaries may represent an automatic selection via an editing tool, or a selection that is based on manual manipulation of an editing tool by a user. The selection refinement tool is operable to modify the selection boundaries by positioning of a cursor of the refinement tool proximate to the selection boundaries. In response to positioning of the cursor relative to the selection boundaries, the cursor is dynamically resized in dependence upon a positional relationship between the cursor and the selection boundaries, such that boundaries of the cursor are kept from intersecting with the selection boundaries.

20 Claims, 8 Drawing Sheets

(56) References Cited

U.S. PATENT DOCUMENTS

2013/0067380 A1* 3/2013 Pettigrew .................. G06T 7/12
715/771
2013/0120442 A1* 5/2013 Dhawan ................ G06T 3/0012
345/629

* cited by examiner

SELECTION REFINEMENT TOOL

BACKGROUND

Consumer image editing is on the rise due at least in part to wide availability of the mobile phones, tablets, and other portable devices that include cameras and are powerful enough to support image editing software. A variety of different editing operations may be applied to process an image. In connection with image editing operations, a user may make selections of objects and/or other portions of an image to which the editing operations are applied. Editing software may provide tools for refinement of selections within images. For example, a brush tool can be used to make selections, modify selections, perform operations, and so forth. Generally, adjustment of the size of the brush tool and a cursor representing the brush tool is a manual process that can be quite time consuming. The manual process may also be difficult to use on mobile phones, tablets, and other mobile platforms. Accordingly, brush and cursor resizing may be tedious, make it more difficult to edit images, and lead to user frustration.

SUMMARY

Selection refinement tool techniques are described in which a selection of portions within an image exposed for editing in an image editing environment are modified using a tool that automatically resizes according to the shape of selection boundaries for the selection at different locations. In one or more implementations, selection boundaries indicative of a selection of one or more portions of an image exposed for editing in a user interface are displayed. The selection may represent an automatic selection via an editing tool, or a selection that is based on manual manipulation of an editing tool by a user. An option to launch or interact with a selection refinement tool is made available via the user interface. The selection refinement tool is operable to modify the selection boundaries by positioning of a cursor of the refinement tool proximate to the selection boundaries. In response to positioning of the cursor relative to the selection boundaries, the cursor is automatically resized in dependence upon a positional relationship between the cursor and the selection boundaries, such that boundaries of the cursor are kept from intersecting with the selection boundaries.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
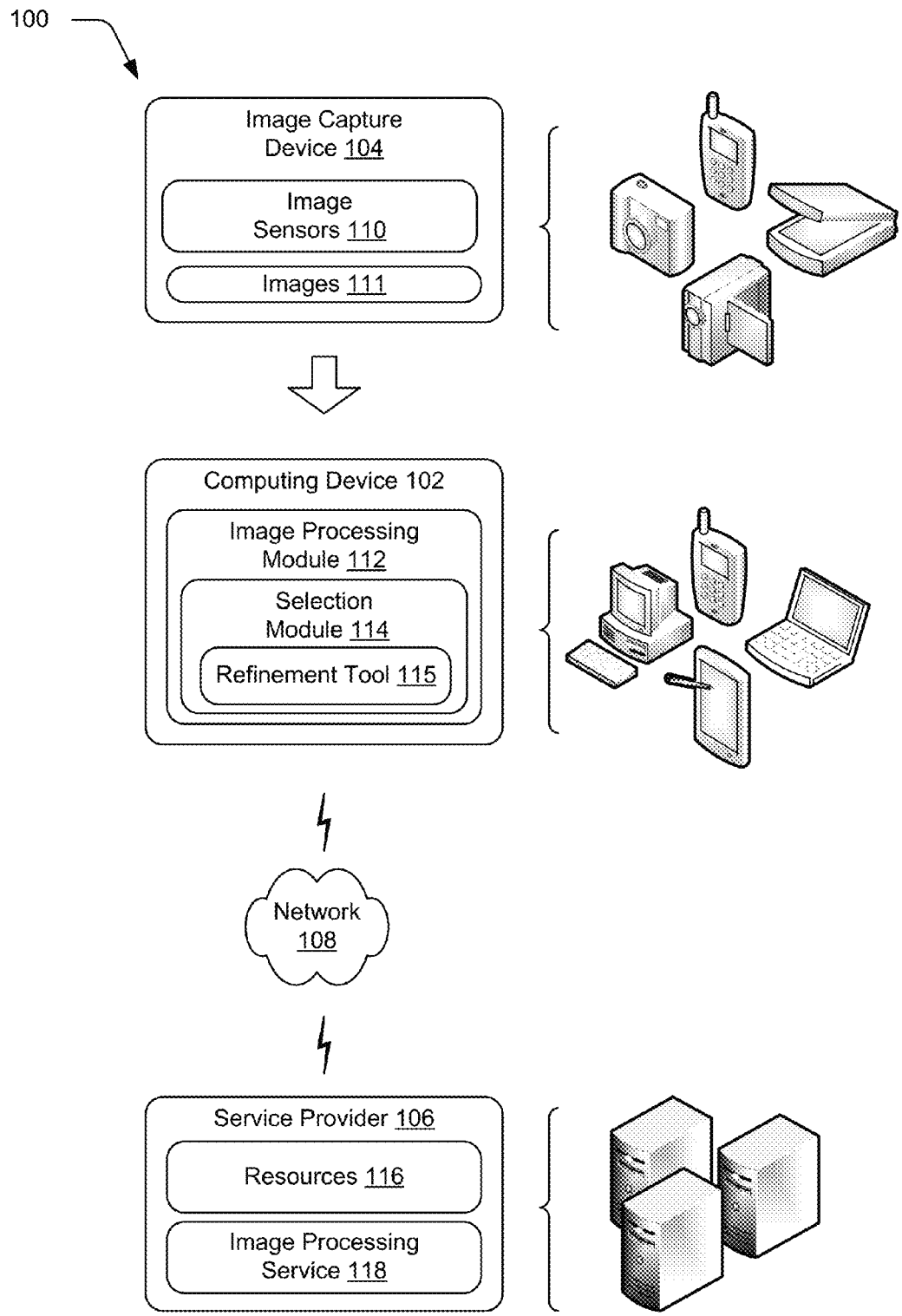
FIG. 1 is an illustration of an environment in an example implementation that is operable to employ techniques described herein.

Generally, adjustment of the size a cursor for an image editing tool (e.g. a brush or selection tool) is a manual process that can be quite time consuming. The manual process may also be difficult to use on mobile phones, tablets, and other mobile platforms. Accordingly, cursor resizing may be tedious, make it more difficult to edit images, and lead to user frustration.

Selection refinement tool techniques are described in which a selection of portions within an image exposed for editing in an image editing environment can be modified using a tool that automatically resizes according to the shape of selection boundaries for the selection at different location. The selection refinement tool may be employed for various image editing operations and tools typically provided by image editing application, one example of which is Adobe Photoshop™.

In one or more implementations, selection boundaries indicative of a selection of one or more portions of an image exposed for editing in a user interface are displayed. The selection may represent an automatic selection via an editing tool, or a selection that is based on manual manipulation of an editing tool by a user. An option to launch or interact with a selection refinement tool is made available via the user interface. The selection refinement tool is operable to modify the selection boundaries by positioning of a cursor of the refinement tool proximate to the selection boundaries. In response to positioning of the cursor relative to the selection boundaries, the cursor is automatically resized in dependence upon a positional relationship between the cursor and the selection boundaries, such that boundaries of the cursor are kept from intersecting with the selection boundaries.

In one approach, the positional relationship is derived based on a level set matrix that is computed using a level set mechanism. The level set matrix (as shown an discussed in relation to FIG. 7) enables a determination of the positional relationship as being intersecting, or non-intersecting (e.g., inside or outside), with respect to the selection boundaries. When the cursor intersects the selection boundaries, the cursor is reduced in size to an optimal size that corresponds to the shape of the selection boundaries at the current location and that is non-intersecting. When the cursor does not intersect the selection boundaries, the cursor is expanded until the cursor abuts the selection boundaries (e.g., within a proximity tolerance value) or reaches a defined maximum size.

Selection refinement tool techniques as described herein enhance image editing by making selection refinement faster, more convenient, and more accurate than manual resizing. Rather than having to perform multiple manual resizes to modify a large and odd-shape selection, a user can simply set the system to automatically resize the cursor in response to positioning of the cursor in different locations relative to the selection. In effect, the cursor appears to dynamically resize and "snap-to" selection boundaries as the cursor is manipulated around the image. The user does not have to interrupt work for resizing and the resizing can precisely optimize the cursor size based on the shape and contours of the selection at different locations.

In the following discussion, an example environment is first described that may employ the techniques described herein. Example details and procedures are then described which may be performed in the example environment as well as in other environments. Consequently, example details and procedures are not limited to the example environment and the example environment is not limited to example details and procedures described herein.

Example Environment

FIG. 1 is an illustration of an environment 100 in an example implementation that is operable to employ techniques described herein. The illustrated environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102 may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 8 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 102. The image capture device 104 is illustrated as including image sensors 110 that are configured to form images 111. In general, the image capture device 102 may capture and provide images 111, via the image sensors 110 that may be stored on and further processed by the computing device 102 in various ways. Naturally, images 111 may be obtained in other ways also such as by downloading images from a website, accessing images from some form of computer readable media, and so forth.

The images 111 may be obtained by an image processing module 112. As before, although the image processing module 112 is illustrated as being implemented on a separate device it should be readily apparent that other implementations are also contemplated in which the image sensors 110 and image processing module 112 are implemented on the same device. Further, although illustrated as being provided by a computing device 102 in a desktop configuration, a variety of other configurations are also contemplated, such as remotely over a network 108 as a service provided by a service provider, a web application, or other network accessible functionality.

Regardless of where implemented, the image processing module 112 is representative of functionality operable to manage images 111 in various ways. Functionality provided by the image processing module 112 to manage images may include but is not limited to functionality to organize, access, browse and view images, as well as to perform various kinds of image processing operations upon selected images. By way of example and not limitation, the image processing module 112 may include or otherwise make use of a selection module 114.

The selection module 114 is representative of functionality to perform selections within images in connection with image editing operations. The selection may involve designating one or more selected portions or objects within the image as "selected". Image editing operations may then be applied to the "selected" portions and not to other, "non-selected" portions. Selections include automatic selections that are made by operation of an editing tool as well as manual selections made through user manipulation of a tool such as a lasso, cropping, or brush selection tool. When a selection is made via the selection module 114, corresponding selection boundaries are rendered within a view of the image being edited.

In accordance with selection refinement tool techniques described herein, the image processing module 112 further includes a refinement tool 115 that is operable in connection with the selection module 114. In the illustrated example, the refinement tool 115 is depicted as a tool implemented by the selection module 114. Alternatively, the refinement tool 115 may be a separate component of the image processing module 112, or even a standalone module that may be invoked by various editing tools to facilitate selection refinement in the manner described herein. For instance, the refinement tool 115 may be employed to modify selection boundaries for any image editing tool or process that utilizes a resizable cursor, brush, or instrumentality.

By way of example, the refinement tool 115 may be configured to modify the selection boundaries by positioning of a cursor of the refinement tool proximate to the selection boundaries. Generally speaking, moving the cursor at boundary edges from outside inward causes a reduction of the selection boundaries. Moving the cursor from inside the boundary edges outward causes an expansion of the selection boundaries. The portion of the selection boundary that is reduced or expanded depends upon the size of the cursor, such as the radius of a circular tool or the width of a square tool. Since the selection boundary and image portions often have non-regular shapes, resizing of the cursor at multiple different points in the image is likely to be needed in order to precisely refine the selection.

Accordingly, the refinement tool 115 can be configured to provide an option for automatic cursor resizing as described above and below. For example, a toggle control implemented via the refinement tool may be exposed to enable a user to selectively turn automatic resizing of the cursor on or off. When automatic resizing is turned-off, the refinement tool 115 can support manual resizing techniques. When automatic resizing is activated, the cursor is automatically resized in response to movement of the cursor relative to the selection boundaries.

Broadly speaking, the resizing occurs in dependence upon a positional relationship between the cursor and the selection boundaries. The positional relationship can be determined in various ways, an example of which is using a level set matrix as discussed later in this document. Additionally, the size for the cursor is selected to correspond to the shape and contours of the selection boundaries at the current position. Additionally, the refinement tool 115 ensures that the cursor after resizing does not intersect with the selection boundaries. In this way, the cursor is resized dynamically as the cursor is moved around the image and may appear to snap to the edges of the boundaries. Details regarding these and other aspects of selection refinement techniques and operation of a refinement tool 115 are discussed in relation to the following figures.

As further shown in FIG. 1, the service provider 106 may be configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

For example, the service provider 106 in FIG. 1 is depicted as including an image processing service 118. The image processing service 118 represents network accessible functionality that may be made accessible to clients remotely over a network 108 to implement aspects of the techniques described herein. For example, functionality to manage and process images described herein in relation to image processing module 112 and selection module 114 may alternatively be implemented via the image processing service 118, or in combination with the image processing service 118. Thus, the image processing service 118 may be configured to provide cloud-based access to a refinement tool, as well as other tools and functionality described above and below.

Selection Refinement Tool Details

Figure 2:
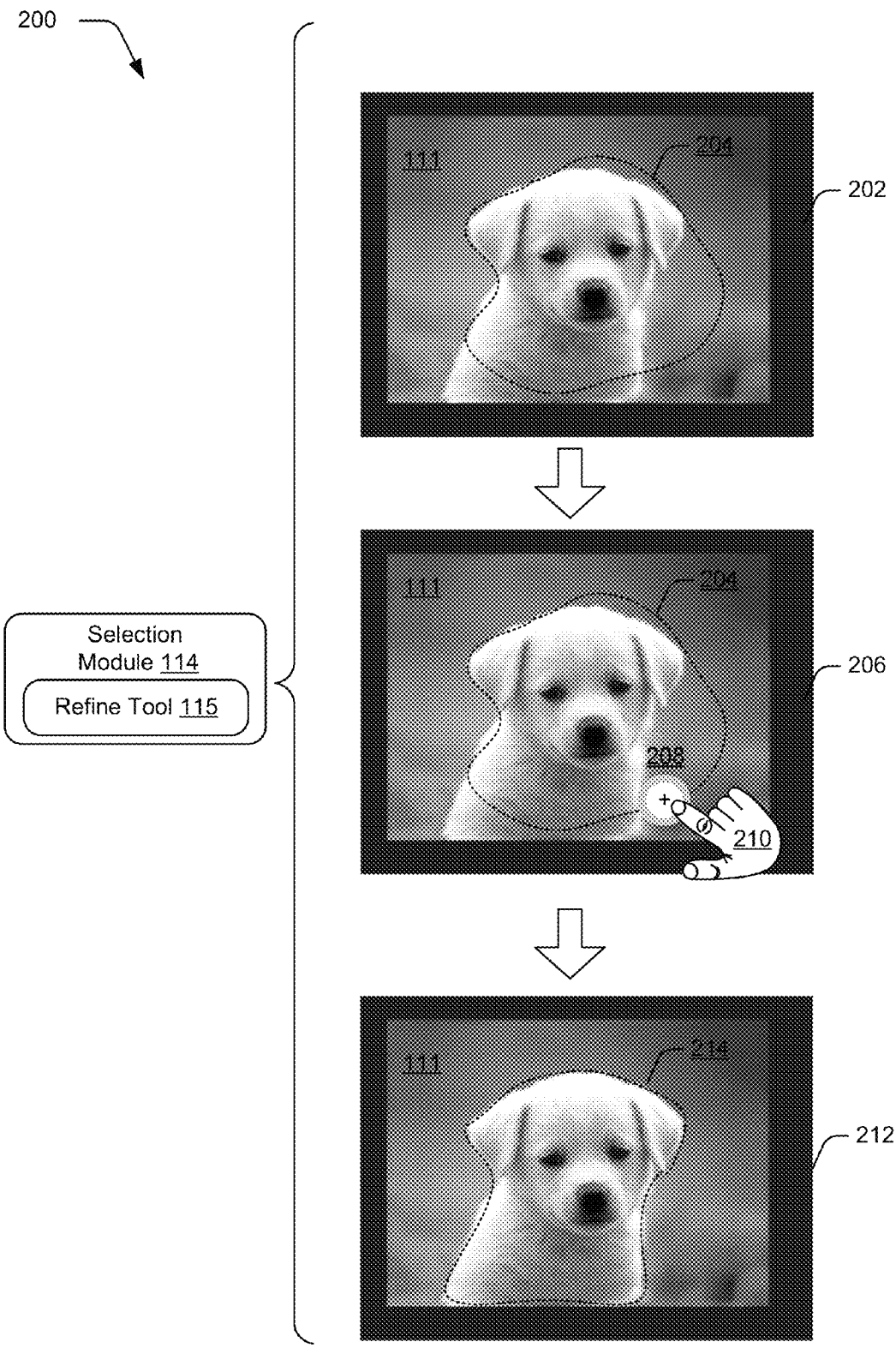
FIG. 2 depicts a system in an example implementation in which operation of selection module to make and refine selections for image editing operations is depicted.

FIG. 2 depicts a system 200 in an example implementation in which operation of the selection module 114 and refinement tool 115 of FIG. 1 is represented in connection with one or more image editing operations. The system 200 is shown using different illustrative stages of making and refining selections within an image 111 in connection with an image editing operation. The image may be obtained, directly from one or more image sensors 110, from storage upon some form of computer-readable media, by downloading from a web site, and so on.

As shown in FIG. 2, the image 111 may be exposed for editing within a user interface associated with the image processing module 112 as represented by stage 202. The user interface may provide functionality operable to perform various image editing operations upon the image. In an implementation, the user interface may be configured to support touch interaction in addition to or in lieu of input via a mouse, keyboard or other input device. Functionality for various image editing operations may be provided using one or more different types of user interface instrumentalities such as selectable icons, menu items, lists, key combinations, tool bars, interactive dialogs, or pop-up elements, to name some examples. The user interface may be further configured to support gestures and input patterns that may be mapped to corresponding actions and functionality, such as gestures that are associated with different selection modes discussed herein. Thus, a user may interact to view, edit, navigate, select, and otherwise manipulate an image or a library of images using functionality accessible via the user interface.

In the context of techniques described herein, the user interface may be configured to support a refinement tool 115. For example, interaction by a user may be employed to make selections in the image 111. In one approach, a brush selection tool can be implemented that enables a user to swipe back and forth (using touch or an input device) across portions of the image to cause addition of the portions into a selected group. Other selection techniques are also contemplated, such as using a lasso tool, selection box, enclosing portions within a circle, or automatic selections by system tools. The selection result in positioning of selection boundaries 204 within the image as represented in stage 202. For the purpose of illustration, the selection boundaries 204 are illustrated as being a rough and unrefined selection of the dog in the example image.

As represented in stage 206, the refinement tool 115 can be invoked to refine the selections boundaries 204. In particular, activation of the refinement tool 115 exposes a cursor 208 for the tool that is operable to refine the selection boundaries to produce a more precise selection. The cursor 208 may be manipulated around the image using touch input 210 (as illustrated), or another suitable input mechanism. The cursor can be configured in various way. By way of example and not limitation, the example cursor has a generally circular shape. In addition, the cursor is depicted as having an inner circle that represents the active component of the tool and an outer circle that represents a defined maximum size for the cursor, further details of which are discussed in relation to the following figures. Other configurations of a cursor are also contemplated, such as using a single circle, a square, a triangle, or a brush shape to name a few examples.

As noted, a user can manipulate the cursor around the image to move the selection boundaries in and out at different locations to refine the selection. As represented in stage 212, operation of the refinement tool 115 results in a refined selection 214, which in this example corresponds to the outline of the dog in the example image. In connection with operation of the refinement tool 115, the cursor 208 can be automatically resized to adapt to the selection boundaries in the manner described herein, thereby making the refinement process faster, more convenient, and more precise. Further details regarding refinement and resizing using a refinement tool 115 are discussed in relation to the examples of FIGS. 3 to 7 discussed below.

Figure 3:
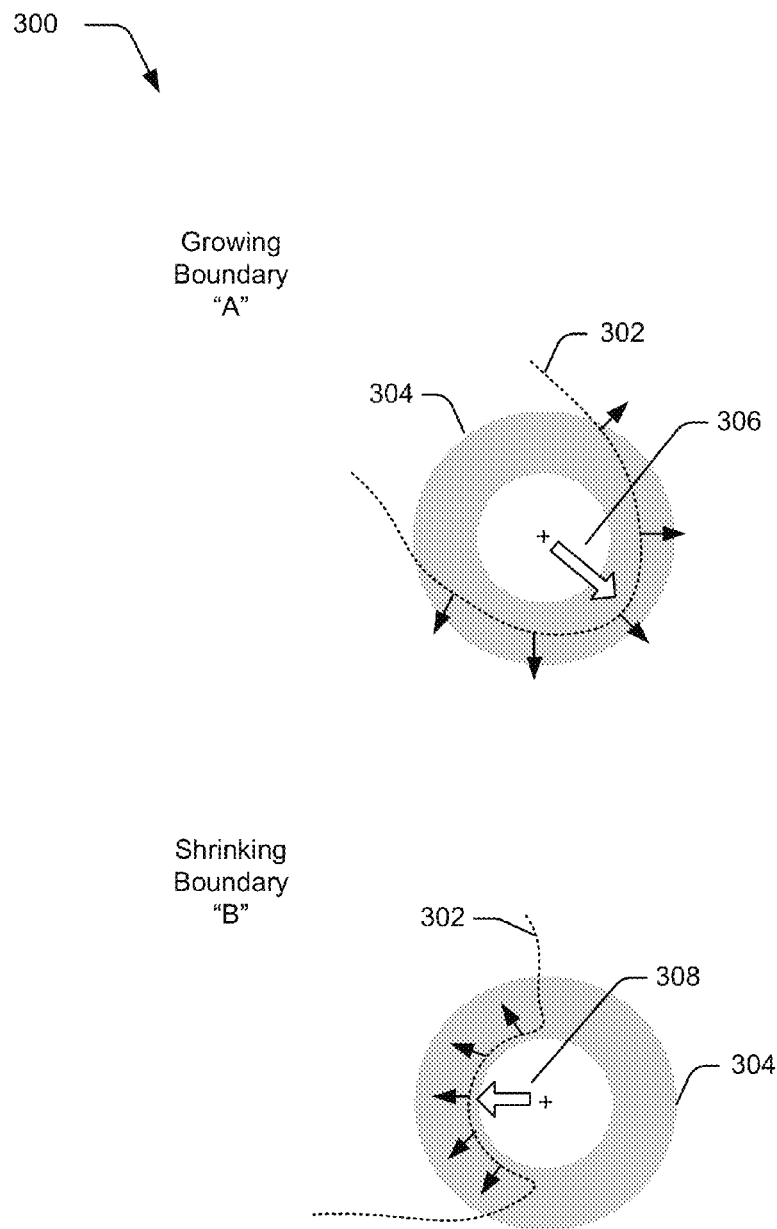
FIG. 3 illustrates details of selection boundary refinement using a cursor in accordance with one or more implementations.

FIG. 3 depicts generally at 300 details of selection boundary refinement using a cursor in accordance with one or more implementations. In particular, view "A" represents a growing of a selection boundary 302 based on manipulation of a cursor 304 from a position inside of the boundary outwards as indicated by arrow 306. Once again in this example, the cursor 304 is illustrated as having a circular shape with inner and outer portions. The inner circle is a defined part of the cursor 304 that correspond to the active component of the tool. Editing operations are driven by position of the inner circle relative to image elements and/or selections boundaries. Accordingly, resizing as described herein generally applies to the inner circle (e.g., the active area or the tool). The outer circle can optionally be shown to represent a defined maximum size assigned to the cursor. Cursor size can be varied between zero (or a defined minimum size) and the defined maximum size. The outer circle provides a visual indication of the size to which the cursor may grow. This can be employed as a mechanism to convey the size range to the user so that the user can take action to change the size range in appropriate circumstances. Naturally, techniques discussed herein can be applied to cursors having different shapes, and with or without using the outer portion.

View "B" of FIG. 3 represents a shrinking of the selection boundary 302 based on manipulation of a cursor 304 from a position outside of the boundary inward as indicated by arrow 308. In both the growing and shrinking scenarios, the selection boundary is modified in a direction away from where the active part of the cursor meets the selection boundary 302. The cursor does not necessarily have to touch the boundary, rather, for the purpose of refinement operations described herein the cursor is considered to meet or abut the selection boundary 302 when boundaries of the cursor (e.g., the active part) come within a defined proximity tolerance of touching the boundaries.

Figure 4:
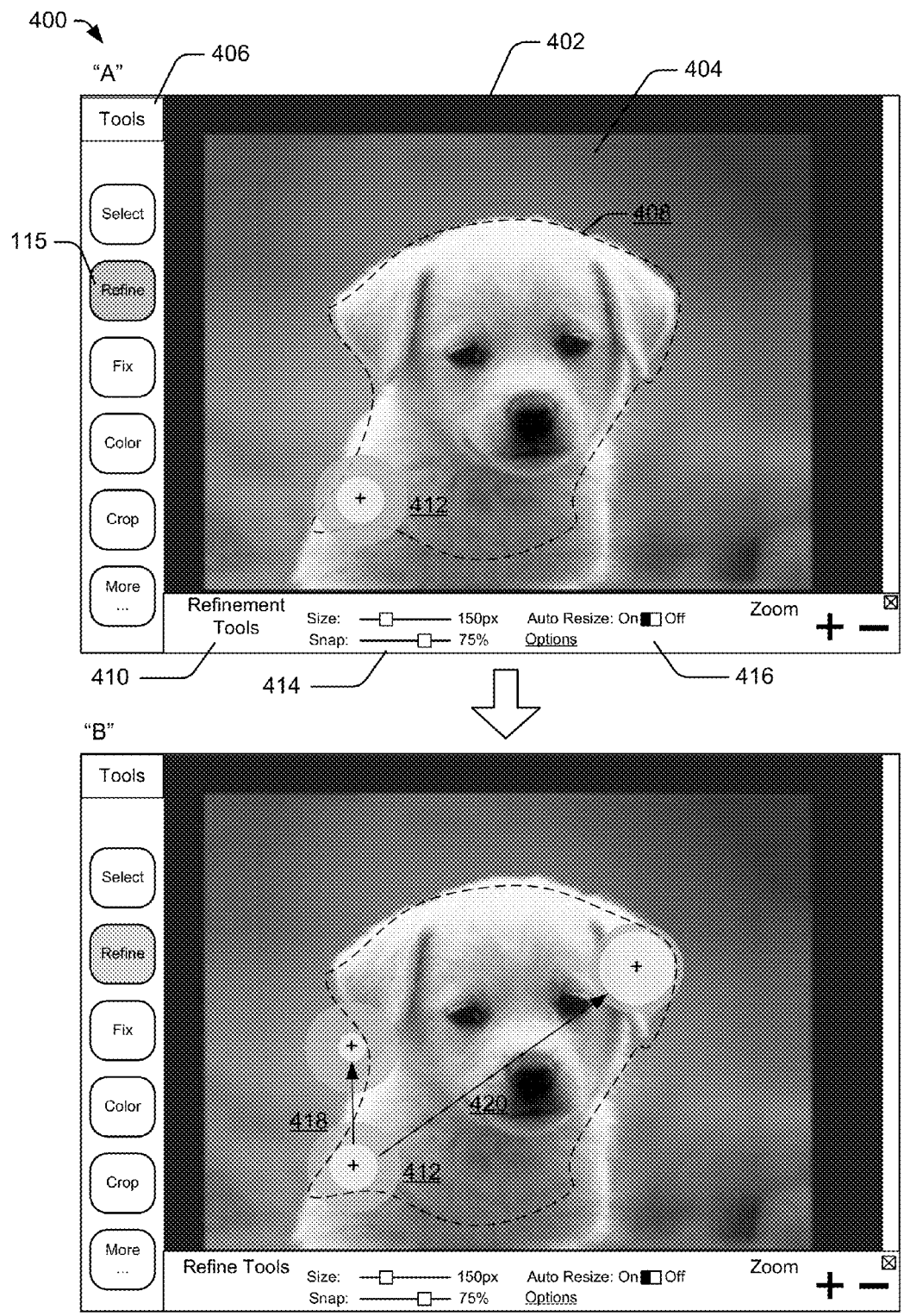
FIG. 4 illustrates details of selection refinement in an example scenario in which a user interface having a selection refinement tool is utilized for refined selection in accordance with one or more implementations.

FIG. 4 illustrates generally at 400 details of selection refinement in an example scenario in which a user interface 402 having a selection refinement tool is utilized for refined selection in accordance with one or more implementations. The details are discussed in relation to different views "A" and "B" of the user interface 402. The example user interface may be exposed via an image processing module 112 as previously mentioned. The user interface 402 may include an image display area 404 in which an image is presented. The presented image may be viewed and manipulated in various ways by a user using functionality provided by the image processing module 112. Various functionality may be accessible via a tools menu 406, which in this example is as a tool bar having selectable icons corresponding to various tools and image editing operations. Other configurations of a tools menu 406 are also contemplated such as a menu bar, a pop-up tool box, or other suitable configuration that facilitate selection from among various functionality provided by the image processing module 112. As represented in FIG. 4, the tools menu 406 may implement at least a refinement tool 115 operable to perform various operations upon the image as discussed herein. In connection with refinement selection, an automatic resizing mode can be activated responsive to recognition of input to select automatic resizing. The system can therefore switch back and forth between manual and automatic modes for cursor resizing.

Here, view "A" depicts rendering of selection boundaries 408 within the image corresponding to a selection of portions of the image. Activation of the refinement tool 115 via the tools menu 406 or otherwise may cause appearance of a user interface element 410 having options for selection refinement and appearance of a cursor 412 for modification of the selection boundaries 408. In the depicted example, the user interface element 410 is configured as a tool bar. Other configurations are also contemplated, such as a pop-up tool interface, tool tab, dialog, and so forth. The user interface element 410 provides various functionality for operation of the refinement tool 115. The functionality can include options related to manual resizing 414, such as a slider to set the cursor size and a slider to control how the cursor snaps to boundaries. Additionally, a toggle control 416 is provided that enables a user to selectively turn automatic resizing of the cursor on or off. In this case, the toggle control 416 is depicted as a switch that can be set to on and off positions, and is currently set to the on position. Other configuration of a toggle control 416 suitable to selectively turn automatic resizing on and off are also contemplated.

View "B" represents examples of automatic resizing the cursor 412 of view A in response to input applied to position the cursor relative to the selection boundaries 408. In particular, input 418 is represented as causing movement of the cursor to a position outside of the selection boundaries. When this occurs, resizing is automatically triggered. In this case, the resizing is represented as a reduction of the size of the cursor (e.g., reduction of the radius of the inner circle). It is noted, that the resizing results in an arrangement in which the inner circle of the cursor 412 abuts and does not overlap the selection boundaries 408. In both the initial and relocated positions for the cursor, sizing corresponds to the shape of the selection boundaries 408 at the point where the cursor is located.

Likewise, input 420 is represented as causing movement of the cursor to a different position inside of the selection boundaries 408. Note that the boundary shape at the relocated position has additional space which permits expansion of the cursor 412. As such, resizing is represented as an increase of the size of the cursor to conform to the shape of the selection boundaries 408. Additional aspects of a selection refinement tool and techniques to automatically resize a cursor in connection with boundary refinement are discussed in relation to the following example procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example of FIGS. 1-4.

Figure 5:
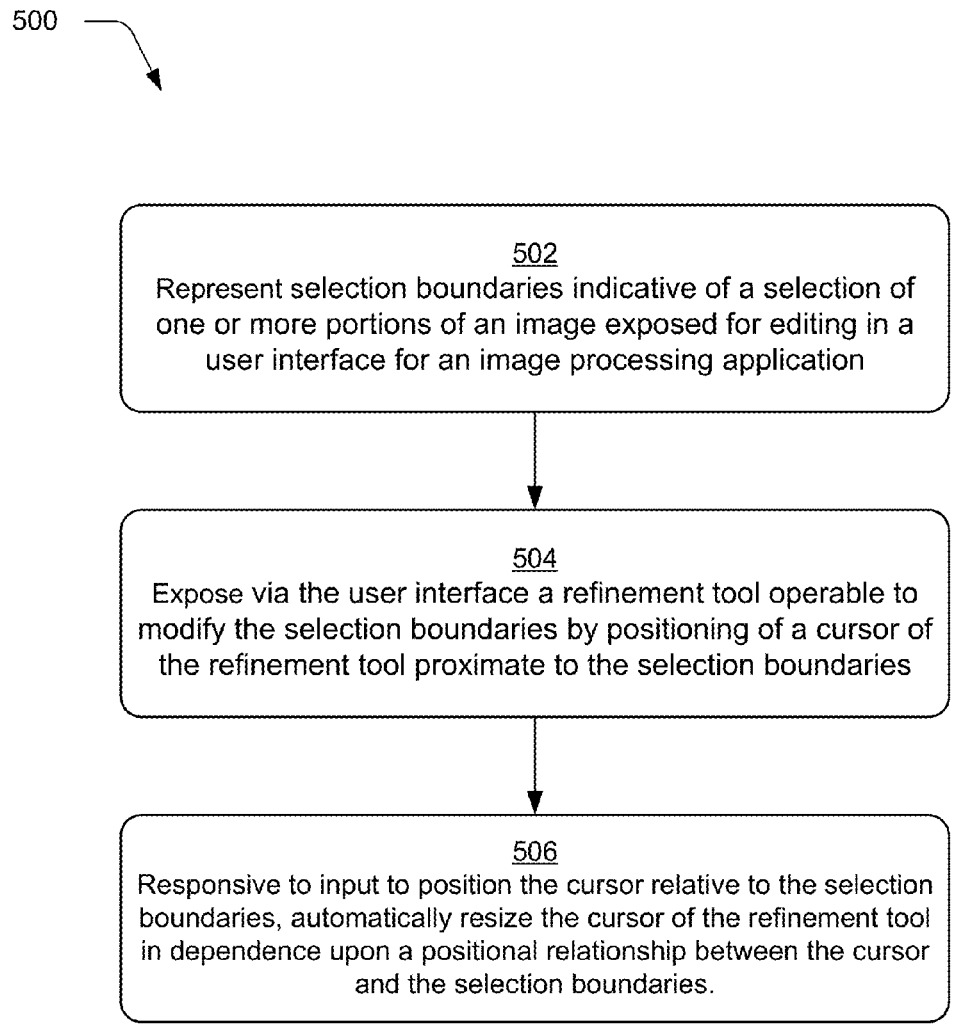
FIG. 5 is a flow diagram depicting a procedure in an example implementation of a selection refinement tool.

FIG. 5 is a flow diagram depicting a procedure 500 in an example implementation of a selection refinement tool. Selection boundaries indicative of a selection of one or more portions of an image exposed for editing in a user interface for an image processing application are represented (block 502). For example, an image processing module 112 may be invoked to view and process images as discussed herein. The image processing module 112 may support selections via a selection module 114 as well as other functionality for managing and performing image editing operations upon images. A selected image may be exposed for editing via a user interface provided by or otherwise associated with the image processing module 112. Selection boundaries associated with automatic and manual selection are rendered with views of images edited via the image processing module 112.

A refinement tool operable to modify the selection boundaries by positioning of a cursor of the refinement tool proximate to the selection boundaries is exposed via the user interface (block 504). For example, a refinement tool 115 as discussed previously may be made accessible via the user interface. Generally, the refinement tool is operable to facilitate selection refinement and cursor resizing in conjunction with resizable cursors associated with the multiple tools. For instance, the user interface may corresponds to an image editing application configured to provide multiple tools for editing images and the refinement tool 115 may be employed with selection tools and other tools in the image editing context. The refinement tool 115 tool may also be employed in other scenarios, including but not limited to with other types of applications (e.g., a paint program or video production application).

Responsive to input to position the cursor relative to the selection boundaries, the cursor of the refinement tool is automatically resized in dependence upon a positional relationship between the cursor and the selection boundaries (block 506). As noted, an automatic resize mode may be activated via the refinement tool 115. For instance, a toggle control 416, as discussed previously, that is exposed in conjunction with the refinement tool may be used to selectively turn automatic resizing of the cursor on or off. When automatic resizing is activated, then cursor size is automatically adjusted in response to positioning of the cursor relative to a selection. An optimal size for the cursor is computed based upon the current position of the cursor as well as the shape of the boundaries at the current position. In other words, the size of the cursor is resized to conform to the selection boundaries as the cursor is move, which facilitates the selection refinement process.

Accordingly, the resizing process generally involves determining a positional relationship between the cursor and the selection boundaries and then computing an optimal size for the cursor based on the positional relationship. In or more implementations, the positional relationship is established as being intersecting or non-intersecting with respect to the selection boundaries. Additionally, the positional relationship may reflect a location of a center point of the cursor. When the cursor is non-intersecting, the positional relationship further indicates whether the cursor is located inside or outside of the selection boundaries. The positional relationship can be established in any suitable way. By way of example and not limitation, a level set mechanism can be employed to recognize whether the cursor is inside, outside, or intersecting with respect to the selection boundaries. Details regarding using a level set mechanism for cursor resizing are discussed below in regards to the examples of FIGS. 6 and 7.

The way in which the cursor is resized depends upon the positional relationship that is established. In particular, the direction of resizing depends upon whether the cursor is intersecting or non-intersecting with respect to the selection boundaries. When the positional relationship is non-intersecting, the cursor is expanded. For instance, the cursor may be expanded until the cursor meets or abuts the selection boundaries (e.g., within a defined proximity tolerance of touching the boundaries) unless a defined maximum size is reached first. If the defined maximum size is reached, the cursor is resized to the maximum. On the other hand, when the positional relationship is intersecting, the cursor is resized to achieve a non-intersecting arrangement. In both cases, the cursor resizing results in an arrangement in which the cursor does not intersect the selection boundaries. When the cursor is circular, resizing comprises setting a size for a radius of the cursor. For other shapes, resizing comprises setting a controlling dimension such as a diagonal for a square or a side length for a triangle.

Given the positional relationship, computation of the radius (or other controlling dimension) can be accomplished using an iterative process. For instance, the cursor size is selected to reach as close as possible to the selection without intersecting. In order to do so, a configurable precision parameter can be set to control distance between boundaries of the cursor and the selection boundaries (e.g., "closeness") when the cursor is resized. Then, sizes for the cursor are computed iteratively until a difference between a starting size and an ending size for an iteration is less than the precision parameter and a non-intersecting arrangement is achieved. As long as the precision parameter constraint remains unsatisfied or the result of an iteration creates an intersecting situation, more iterations occur to compute the optimal size.

In one or more implementations, the iterative computation can be performed using a binary search approach in which the size is reduced or increased for each iteration by half the difference between starting size and an ending size values for the preceding iteration. When the precision parameter constraint is satisfied, the cursor is resized to the ending size as computed by the last iteration.

Figure 6:
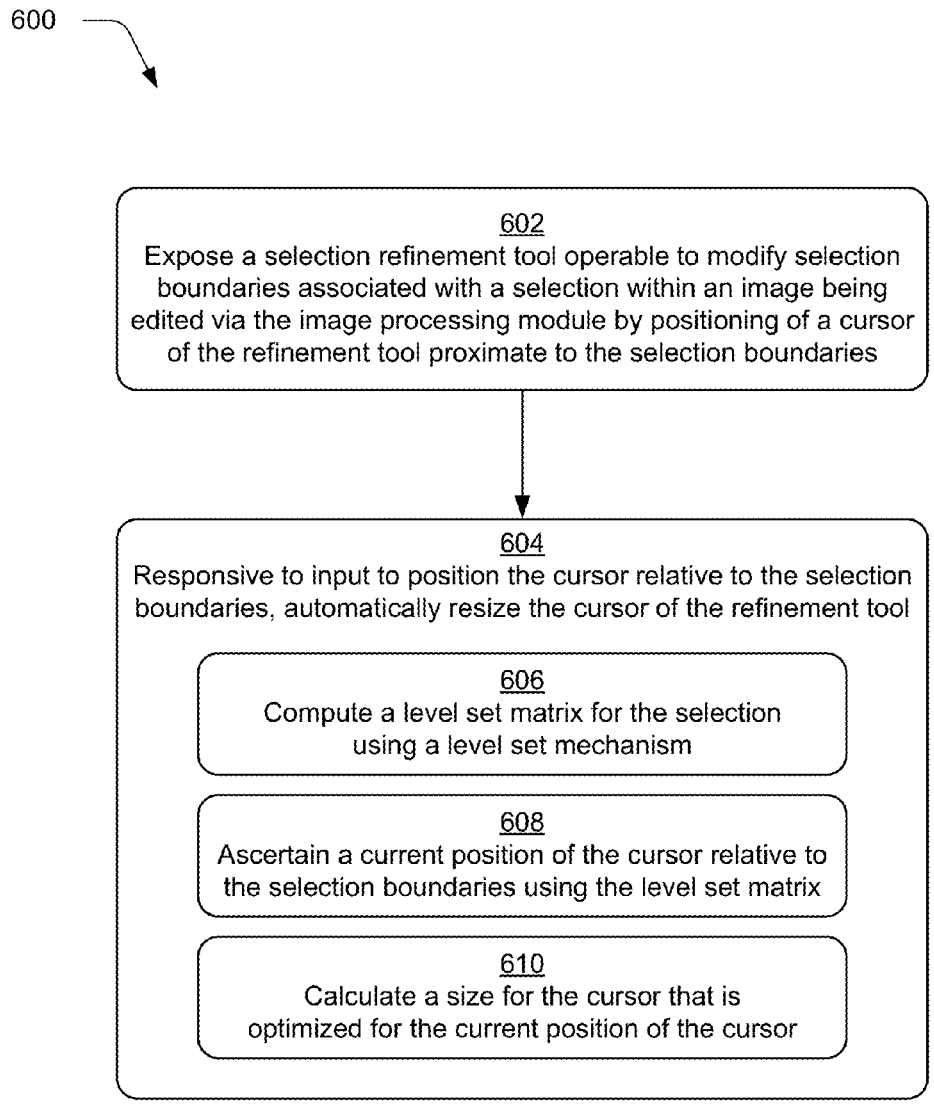
FIG. 6 is a flow diagram depicting a procedure in an example implementation in which level set techniques are employed for resizing of a cursor.

FIG. 6 is a flow diagram depicting a procedure 600 in an example implementation in which level set techniques are employed for resizing of a cursor. The discussion of the procedure 600 includes a section providing details regarding level set techniques that may be employed for selection refinement discussed in this document.

A selection refinement tool is exposed that is operable to modify selection boundaries associated with a selection within an image being edited via the image processing module by positioning of a cursor of the refinement tool proximate to the selection boundaries (602). Responsive to input to position the cursor relative to the selection boundaries, the cursor of the refinement tool is automatically resized (604). A selection refinement tool 115 may be provided and exposed in various ways, examples of which were previously discussed. Further, the refinement tool 115 enables an option for automatically resizing of the cursor in connection with boundary modification. Various techniques to compute an optimal size for the cursor are contemplated. Generally, sizing is dependent upon the position of the cursor relative to the boundaries and the shape/contours of selection boundaries in the area where the cursor is located.

Level Set Mechanism

As mentioned, a level set mechanism may be employed in one or more implementations. Generally, the level set mechanism is configured to define regions inside and outside of the selection boundaries by associating values indicative of the regions with pixels of the image. Details of level set mechanisms are described below as an illustrative example of techniques that may be used for refined selection. However, other suitable mechanisms are contemplated and the inventive concepts are not intended to be limited to level set or other enumerated examples herein.

The level set mechanism operates to recognize a boundary of a region and distinguish between pixels inside and outside of the boundary. In the context of a selection refinement tool discussed herein, the level set mechanism enables refined manipulation of selection boundaries that are established for image processing operations. The level set is one example approach that may be employed to implement a refinement selection mode as described herein.

Suppose a real-valued function over an image $\varphi(x)$, where x is location of each image pixel. A level set is a set of pixels on which $\varphi(x)$ is constant. Typically, level set refers to zero level set, i.e., the set $\{x|\varphi(x)=0\}$, however other values for $\varphi(x)$ can be used to fine tune the system. In addition, $\varphi(x)$ may be defined as a function of distance to the zero level set. In this approach, the zero level set is a curved boundary of a region. Assume that $\varphi(x)$ inside the region is defined as negative and outside the region as positive. Then, $\{x|\varphi(x)=10\}$ is a curve formed by pixels outside the region 10 pixels away from the boundary. On the other hand $\{x|\varphi(x)=-10\}$ is a curve 10 pixels away from the boundary inside the region.

Accordingly, level set can be used to define and recognize an image region, where $\varphi(x)<0$ inside the region, $\varphi(x)>0$ outside the region, and the boundary equates to $\varphi(x)=0$. Since level set is not simply a binary mask, but a smoothly varying field, derivatives of level set can be computed and partial differential equations (PDE) can be implemented. Therefore, level set is naturally suitable for region boundary moving (growing, shrinking and merging) smoothly over time since a PDE that has such properties can be solved. This region boundary moving may be used to make granular refinements to the boundary of a selected set of pixels as described herein.

In one example, an advection PDE in the form $d\varphi/dt + vx \, d\varphi/dx + vy \, d\varphi/dy = 0$ is used for boundary manipulations. Here, vx and vy represent velocity in x and y directions. The terms $d\varphi/dt$, $d\varphi/dx$, and $d\varphi/dy$ are partial derivatives of F with respect to t (e.g., time), x and y. The velocity vector is defined as $v=(vx,vy)$. The PDE may be solved in any suitable way, examples of which include but are not limited to upwinding or semi-lagrangian advection methods. The solution to the PDE provides movement of the boundary interface in the direction of velocity. The selection boundary (e.g., the zero level set) may be manipulated in any direction by selectively setting the corresponding velocity v and direction. For example, the level set selection may be configured to set v as slightly growing or shrinking along the gradient direction (e.g., for addition or removal from the selection). An edge snapping velocity may also be computed from the second derivative of image intensity. In addition or alternatively, a smoothing velocity component may be added to control the amount of jaggedness of a selection boundary.

When level set is employed, a level set matrix for the selection is computed using a level set mechanism (block 606) and a current position of the cursor relative to the selection boundaries is ascertained using the level set matrix (608). Then, a size is calculated for the cursor that is optimized for the current position of the cursor (block 610). In particular, the level set mechanism can be used to compute a level set matrix for a selection that assign values to pixels representative of relative distances of the pixels with respect to a boundary. In this case, the boundary is a selection boundary for the image processing operation. The matrix is used to resolve the positional relationship of the cursor to the cursor. This may involve correlating pixels associated with the cursor to the matrix to determine if any of the pixels have a value of zero.

If any of the pixels of the cursor correlate to a value of zero, then the cursor intersects the boundary. If not, then the cursor is located either inside or outside of the boundary and the signs of the pixel values as positive or negative indicate the position. The level set matrix can additionally be used to ensure that the cursor is not intersecting when resized. This can be accomplished by checking to make sure signs for the pixels of the cursor after resizing all have the same signs. In other words, resizing the cursor includes determining a size for the cursor that achieves an arrangement in which the cursor is positioned entirely in one of the regions as defined by the level set mechanism.

Figure 7:
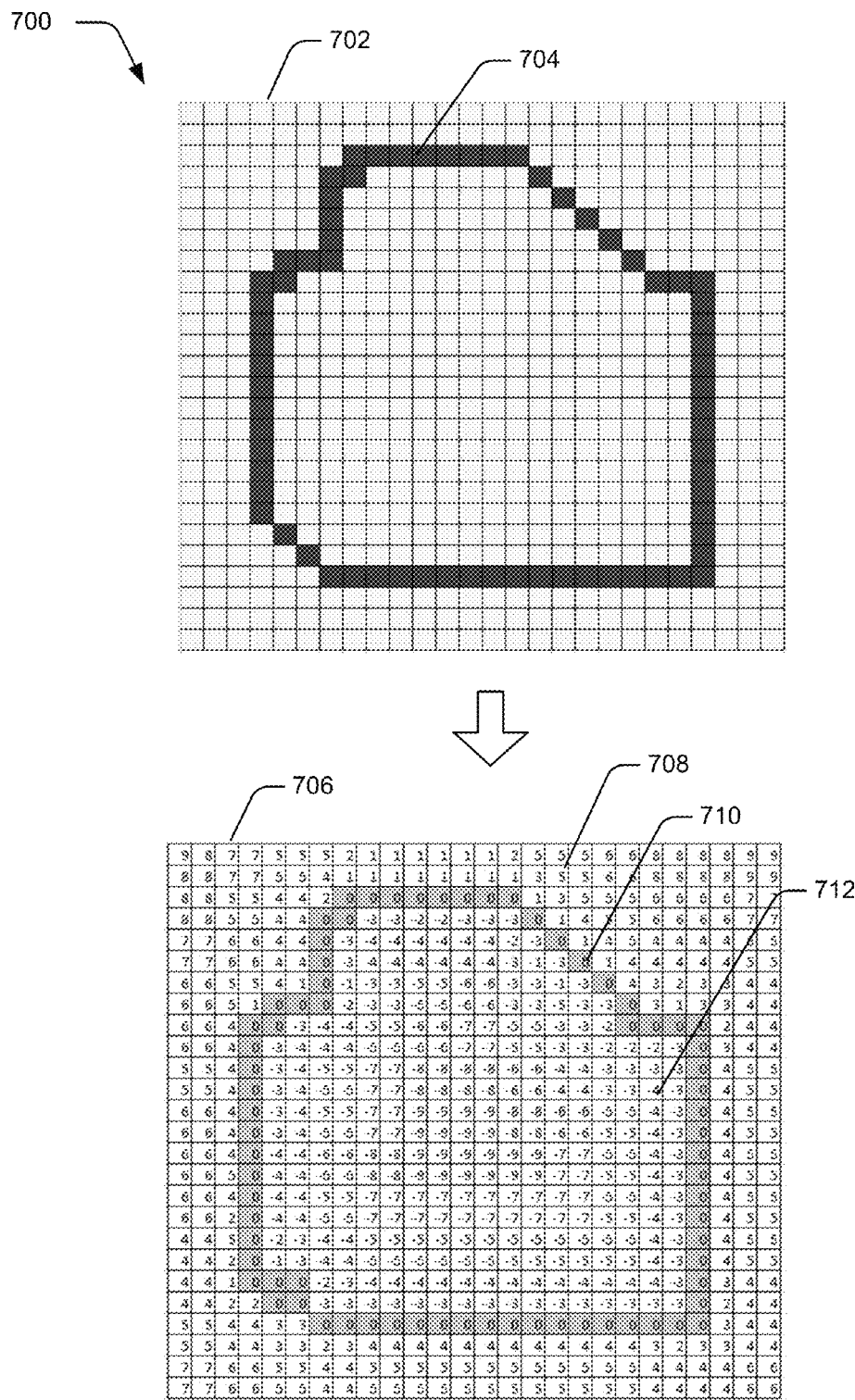
FIG. 7 illustrates an example level set matrix for a selection in accordance with one or more implementations.

Consider FIG. 7, which illustrates generally at 700 an example level set matrix for a selection in accordance with one or more implementations. In the example of FIG. 7, a grid view of an example image 702 is shown to represent individual pixels of the image. The image 702 includes a selection boundary 704. A corresponding level set matrix 706 for the selection is shown. This example represents a zero level set in which positive values are assigned to pixels 708 outside of the selection boundary 704, values of zero are assigned to pixels 710 of the selection boundary, and negative values are assigned to pixels 712 inside of selection boundary. As discussed, the level set matrix can be employed to determine whether the current cursor position is intersecting or non-intersecting with respect to the selection boundaries and an optimal cursor size is then calculated accordingly. When the current position is non-intersecting as per the matrix, cursor size is expanded to abut the selection boundaries (or to a defined maximum size). When the current position is intersecting as per the matrix, cursor size is reduced to achieve a non-intersecting arrangement.

Having consider example details of and procedures related to a selection refinement tool, consider now a discussion of an example system having various representative components that can be utilized to implement aspects of the techniques described herein.

Example System and Device

Figure 8:
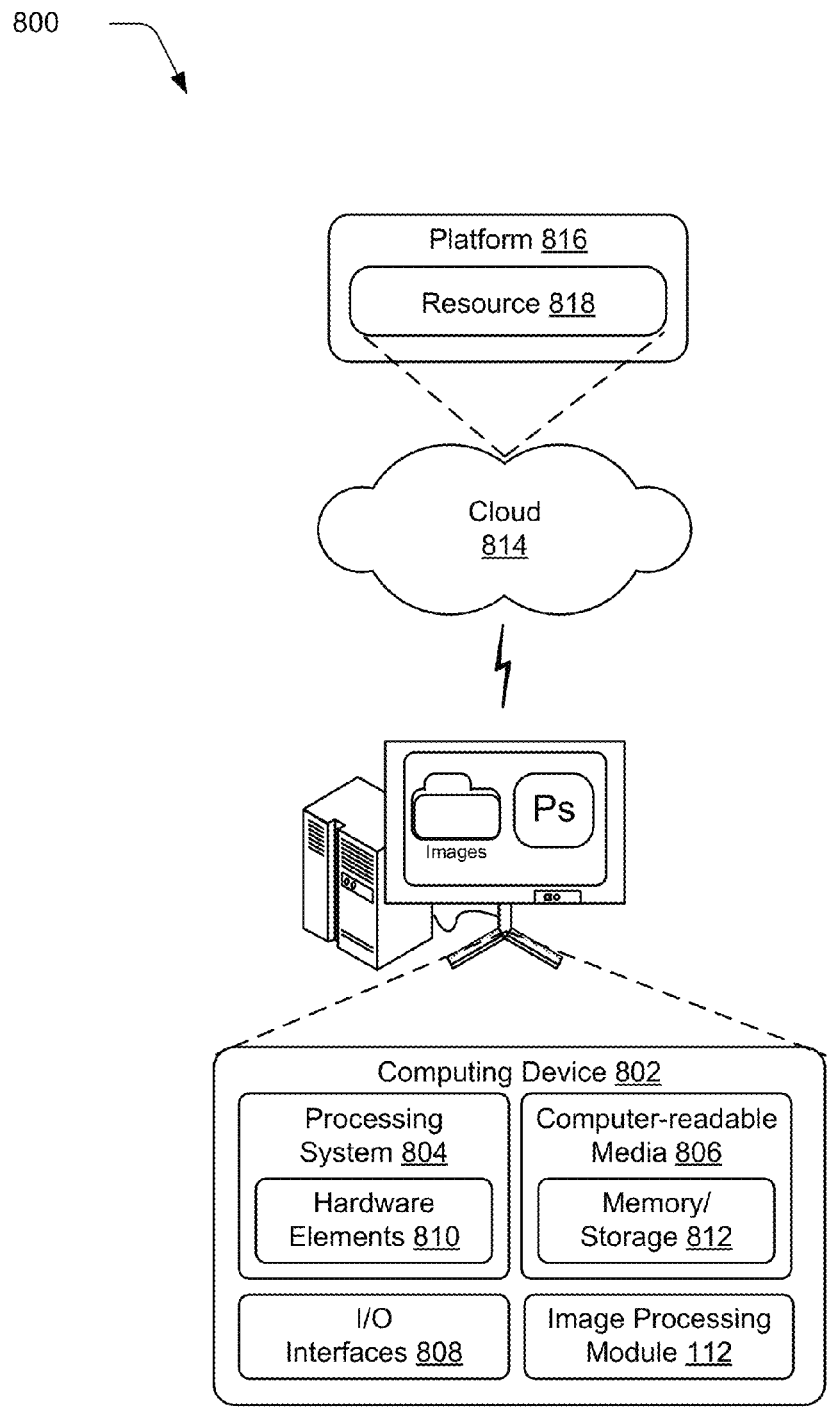
FIG. 8 illustrates an example system including various components of an example device that can be implemented as any type of computing device as described or utilized with reference to FIGS. 1 to 7 to implement aspects of the techniques described herein.

FIG. 8 illustrates an example system generally at 800 that includes an example computing device 802 that is representative of one or more computing systems and devices that may implement the various techniques described herein. This is illustrated through inclusion of the image processing module 112, which may be configured to process image data, such as image data captured by an image capture device 104. The computing device 802 may be, for example, a server of a service provider, a device associated with a client (e.g., a client device), an on-chip system, or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media including by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and functions may be executable/operable by one or more articles of manufacture (for example, one or more computing devices 802 and processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes or is representative of a platform 816 for resources 818. The platform 816 abstracts underlying functionality of hardware (e.g., servers) and software resources of the cloud 814. The resources 818 may include applications or data that can be utilized while computer processing is executed on servers that are remote from the computing device 802. Resources 818 can also include services provided over the Internet or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to dynamically resize a cursor for a selection refinement tool in an image processing environment comprising:
    representing selection boundaries indicative of a selection of one or more portions of an image exposed for editing in a user interface;
    exposing via the user interface the selection refinement tool that is operable to modify the selection boundaries by positioning of the cursor of the refinement tool proximate to the selection boundaries, wherein the cursor has a first section representing an active component of the cursor and a second section representing a defined maximum size of the cursor; and
    responsive to input to position the cursor relative to the selection boundaries, automatically resizing the active component of the cursor of the refinement tool in dependence upon a positional relationship between the cursor and the selection boundaries, such that boundaries of the active component of the cursor abut and are non-intersecting with the selection boundaries.

2. A method as described in claim 1, wherein the user interface corresponds to an image editing application configured to provide multiple tools for editing images.

3. A method as described in claim 2, wherein the refinement tool is operable in conjunction with resizable cursors associated with the multiple tools.

4. A method as described in claim 1, wherein automatically resizing the active component of the cursor comprises establishing the positional relationship as being intersecting or non-intersecting with respect to the selection boundaries.

5. A method as described in claim 4, wherein automatically resizing the active component of the cursor comprises expanding the cursor out to abut the selection boundaries or to a defined maximum size when the positional relationship is non-intersecting with respect to the selection boundaries.

6. A method as described in claim 4, wherein automatically resizing the active component of the cursor comprises reducing the cursor to achieve a non-intersecting arrangement when the positional relationship is intersecting with respect to the selection boundaries.

7. A method as described in claim 4, wherein establishing the positional relationship comprises applying a level set mechanism to recognize whether the cursor is inside, outside, or intersecting with respect to the selection boundaries.

8. A method as described in claim 1, wherein resizing the active component of the cursor includes:
    setting a precision parameter configured to control a distance between boundaries of the cursor and the selection boundaries when the active component of the cursor is resized;
    iteratively computing sizes for the active component of the cursor until a difference between a starting size and an ending size for an iteration satisfies the precision parameter and a non-intersecting arrangement is achieved; and
    resizing the active component of the cursor to the ending size.

9. A method as described in claim 1, wherein the cursor is circular and resizing comprises setting a size for a radius of the active component of the cursor.

10. A method as described in claim 1, further comprising exposing via the user interface a toggle control in conjunction with the selection refinement tool, the toggle control operable to selectively turn automatic resizing of the active component of the cursor on or off.

11. A system comprising:
    a processing system including one or more hardware elements;
    an image processing module operable via the processing system to perform operations for refinement of selections within images including:
        exposing a selection refinement tool operable to modify selection boundaries associated with a selection within an image being edited via the image processing module by positioning of a cursor of the refinement tool proximate to the selection boundaries, wherein the cursor has a first section representing an active component of the cursor and a second section representing a defined maximum size of the cursor; and
        responsive to input to position the cursor relative to the selection boundaries, automatically resizing the active component of the cursor of the refinement tool by:
            computing a level set matrix for the selection using a level set mechanism;
            ascertaining a current position of the active component of the cursor relative to the selection boundaries using the level set matrix; and
            calculating a size for the active component of the cursor that is optimized for the current position of the cursor.

12. A system as described in claim 11, wherein:
    the level set mechanism is configured to define regions inside and outside of the selection boundaries by associating values indicative of the regions with pixels of the image; and
    automatically resizing the active component of the cursor includes determining a size for the active component of the cursor that achieves an arrangement in which the active component of the cursor is positioned entirely in one of the regions as defined by the level set mechanism.

13. A system as described in claim 12, wherein:
    ascertaining a current position of the active component of the cursor relative to the selection boundaries using the level set matrix includes determining whether the current position is intersecting or non-intersecting with respect to the selection boundaries; and calculating a size for the active component of the cursor comprises:
    when the current position is non-intersecting, expanding the active component of the cursor size to abut the selection boundaries or to a defined maximum size; or
    when the current position is intersecting, reducing the active component of the cursor size to achieve a non-intersecting arrangement.

14. A system as described in claim 11, wherein calculating a size for the active component of the cursor that is optimized comprises iteratively computing sizes for the active component of the cursor until:
    a non-intersecting arrangement is achieved; and
    a difference between a starting size and an ending size for an iteration is determined to be less than a threshold precision parameter defined to control closeness of the active component of the cursor to the selection boundaries during resizing.

15. A system as described in claim 14, wherein a binary search algorithm is employed to set the starting size and the ending size for iterations of the iterative computation.

16. One or more computer-readable storage media storing instructions that, responsive to execution by a computing device, are configured to cause the computing device to perform operations for refinement of selection boundaries during image processing of an image comprising:
    representing selection boundaries indicative of a selection of one or more portions of the image exposed for editing in a user interface;
    exposing via the user interface a selection refinement tool operable to modify the selection boundaries by positioning of a cursor of the refinement tool proximate to the selection boundaries, wherein the cursor has a first section representing an active component of the cursor and a second section representing a defined maximum size of the cursor; and
    responsive to input to position the cursor relative to the selection boundaries:
        computing a level set matrix that defines regions in the image by assigning positive values to pixels outside of the selection boundaries, values of zero to pixels of the selection boundaries, and negative values to pixels inside of the selection boundaries;
        checking for intersection of the active component of the cursor with the selection boundaries using values assigned by the level set matrix; and
        when intersection is detected:
            reducing a size of the active component of the cursor to achieve a non-intersecting arrangement; or
        when intersection is not detected:
            expanding a size of the active component of the cursor to abut the selection boundaries or to a defined maximum size.

17. One or more computer-readable storage media as described in claim 16, wherein checking for intersection comprises determining whether at least one pixel associated with boundaries of the active component of the cursor correlates to a value of zero in the level set matrix.

18. One or more computer-readable storage media as described in claim 16, wherein the operations for refinement of selection boundaries during image processing of the image further comprise:
    detecting multiple successive changes in position of the active component of the cursor relative to the selection boundaries; and
    dynamically resizing the active component of the cursor responsive to the multiple successive changes, such that the active component of the cursor appears to snap to different sizes in accordance with different shapes of the selection boundaries at different locations.

19. One or more computer-readable storage media as described in claim 16, wherein the operations for refinement of selection boundaries during image processing of the image further comprise:
    modifying the selection boundaries using the cursor as resized, such that the selection boundaries are reduced by manipulation of the cursor from outside of the selection boundaries inward and the selection boundaries are expanded by manipulation of the cursor from inside of the selection boundaries outward.

20. One or more computer-readable storage media as described in claim 16, wherein the operations for refinement of selection boundaries during image processing of the image further comprise:
    setting a proximity tolerance parameter to control a distance between the active component of the cursor and the selection boundaries and adjusting the size of the active component of the cursor in accordance with the proximity tolerance parameter to maintain the distance.

* * * * *